UNITED STATES PATENT OFFICE.

WILLIAM M. HARRISON, OF NEW ROCHELLE, NEW YORK, ASSIGNOR TO NOBLE C. HARRISON, OF TRENTON, NEW JERSEY.

CONCRETE-WATERPROOFING POWDER.

1,221,445.    Specification of Letters Patent.    Patented Apr. 3, 1917.

No Drawing.    Application filed July 23, 1915. Serial No. 41,524.

*To all whom it may concern:*

Be it known that I, WILLIAM M. HARRISON, a citizen of the United States of America, and a resident of New Rochelle, in the county of Westchester and State of New York, have invented certain new and useful Improvements in Concrete-Waterproofing Powders, of which the following is a specification.

This invention relates to an improved concrete waterproofing powder, and the object of the invention is to provide an improved powder which, when used with cement or concrete, will enable it to be waterproofed and made efficient.

It is well known that heavy hydro-carbon oils have been used with cement to waterproof the resultant concrete, but it is as well known that all such concrete has suffered materially in tensile strength. It is also well known that if insolubles, lime stearates and water repellents of this class, be added to dry cement and subsequently a dense mortar is made, the insoluble will coat the cement particles and keep away tempering water sufficient to crystallize the cement. The hydration is, therefore, imperfect and accordingly loss of tensile strength results. On the other hand, if the cement mortar is made very liquid, as is the present day practice on all large commercial concrete enterprises, the chemical insoluble leaves the cement and rides on the water to the point of least resistance, and an integral waterproofing effect is lost.

To waterproof concrete successfully, therefore, the waterproofing unit employed must be held in the tempering water in an emulsion diffused uniformly throughout the cement, sand and aggregates, and become an integral part of the mass, so that when the cement sets, and the concrete dries out, the waterproofing unit will be a homogeneous part, preserved and in place to perform its physical function, and such result is obtained by my invention.

I have discovered that plastic clay, a hydrated aluminum silicate, with the hygroscopic water eliminated only, in powdered form, makes an excellent vehicle or carrier for the glycerids of the fatty acids. The carrier absorbs the fat, permitting of uniform intimate diffusion of the glycerid through the carrier resulting in a waterproofing unit in powdered form for admixture with dry cement in proportion of 2% by weight, or two pounds to each 100 lb. bag of cement employed. The discovery of a colloidal substance as a carrier for non-oxidizing natural fat (a natural water repellent), which due to plasticity will not only not separate from the glycerid in the presence of tempering water when mixed with cement, sand and aggregates, but besides emulsifies with the effect of binding the cement particles, thus insuring a denser mix and stronger concrete, is a discovery of practical importance to the cement industry. Engineers and architects have been looking for the result which this waterproof powder insures, viz., impermeable waterproof concrete of maximum tensile strength, a physical waterproofing unit that will not disturb the natural cementitious processes, diffuse uniformly through the cement mix and become an integral part, waterproofing integrally the finished concrete construction.

With this plastic clay as a carrier, the utilization thereof for concrete waterproofing powder may result by mixing it with one or more neutral glycerids of the fatty acids. These neutral glycerids of the fatty acids, such as animal or vegetable oils or fats, or mixtures of the same, fractionated with solvents, as a hydro-carbon oil, naphtha or turpentine, are mixed with plastic clay, in a thorough manner in a mixing machine, and during this mixture of the said carrier and glycerids with the said solvent, be the same one or more, the mixture is slightly warmed, so as to drive off the volatile solvents. The heat to which these parts are subjected in the heating machine must not be so great,—and particular attention must be paid thereto,—as to alter the character of the glycerids. This thorough mixing is carried out to such an extent until all the essential elements are finely distributed throughout the whole mass, so that a highly effective composition is the result.

The following example has been given excellent results: From 5 to 25 parts of neutral glycerids of the fatty acids, such as hog's lard, tallow, cotton-seed oil, etc., are mixed with about 70 to 95 parts of the plastic clay, which acts as a carrier. After adding a solvent and driving it off, the resulting mass in powdered form is ready to be mixed with the cement, lime, sand or broken stones, in proper proportions for making waterproof concrete for building operations, and the said composition or powder imparts to the concrete a permanent waterproof quality.

My improved waterproofing compound or powder contains the glycerids of the fatty acids in a non-saponified form. The waterproofing quality is not produced by a chemical reaction of the substances during the process of manufacture, but by their physical action, resulting from the intimate and thorough mixing, and the chemical coöperation of the elements referred to among themselves.

In certain cases, the by-products of manufactories, such as chalk, calcium carbonate, one of the waste products of the paper or soap industries, and infusorial earth, may be used instead of the plastic clay, or in certain cases therewith, and the advantage of the plastic clay is that it is dense and gives a compact compound, and the advantage of the chalk and infusorial earth is that it is comparatively light in weight and absorbent to a considerable extent.

But throughout the entire process of manufacturing my improved powder, the object is to attain the chemical coöperation of the elements entering into it, and a physical coöperation of the powder with the cement, so that such coöperation of the elements will enable an efficient use of the powder, when it is mixed with the concrete and cement for building operations, in order that those parts which are to be fused with the cement may readily and quickly adhere thereto, and carry out in an efficient manner the object of the invention.

In many powders used hitherto, certain adulterants were added to reduce the average cost to a commercial proposition, and this adulteration naturally negatives a high degree of efficiency. The improved powder, on the other hand, not being adulterated, presents a comparative economy in that it utilizes a non-chemical waterproofing powder, because no alkali is employed and no chemical reaction occurs. A further economy results, in that either a waste product or some inert substance is used, which is abundant in nature and of nominal cost.

None of the products recommended commercially for waterproofing cement construction now on the market employ one product, but an admixture of one or several carriers with a chemical compound, the chemical compound being the only water repellent, varying from 10 to 30%. It is clear that this ratio regulates the comparative efficiency. The improved powder, as proposed, is 100% alike, because the carrier employed is uniformly charged with the water repellent, the glycerid, and compared with the best products used, while not increasing the first cost by the exclusive method, guarantees double efficiency. The improved powder adds to the cement nothing aside from uniform water repellent powder, 100% pure, that is, of the same or uniform consistency throughout.

A waterproofing powder of the character described has many advantages, which consist largely in successfully maintaining the waterproofing characteristics of cement or concrete in building operations, which is of great importance in connection with the present method of building many-storied buildings and other structures of massive proportions.

Having thus described my invention, I claim as new and desire to secure by Letters Patent:—

1. The herein described process of making a waterproofing composition, which consists in adding a solvent to a neutral glycerid of the fatty acids, mixing them as a solution intimately with a dry and powdered inert carrier, and slightly warming the mixture, during the mixing, so as to evaporate the volatile solvents without saponifying the glycerids, until a dry powder is left.

2. A method of producing a waterproofing composition, which consists in dissolving a neutral glycerid of the fatty acids, mixing the solution with a dry and powdered inert carrier, and evaporating the solution until a dry powder is left.

3. A method of making a waterproofing composition which consists in forming a dry powder comprising from 70 to 95 parts of a dry and powdered inert carrier, and from 5 to 25 parts of a neutral glycerid of the fatty acids in a non-saponified form, the said mixture being made by dissolving the said glycerid in a solvent, mixing the said carrier and the said solution and then evaporating the said solution until a dry powder is left.

4. A concrete waterproofing powder, consisting of plastic clay and a neutral non-saponified glycerid of the fatty acids, intimately mixed to uniform consistency, and forming a dry powder, substantially as herein described.

5. A method of forming a mixture of a finely divided inert carrier and a water repelling substance, which consists in dissolving the said water repelling substance in a suitable solvent, mixing the said inert carrier with the solution thus formed, and then evaporating the said solvent until a powder is left, the temperature being throughout maintained below the temperature at which said water repellent is decomposed.

6. A concrete waterproofing powder, consisting of a powdered inert carrier and a neutral non-saponified glycerid of the fatty acids, intimately mixed to uniform consistency and forming a dry powder, substantially as described.

In testimony that I claim the foregoing as my invention, I have signed my name in presence of two subscribing witnesses.

W. M. HARRISON.

Witnesses:
F. HOGG,
LAURA E. SMITH.